(12) United States Patent
Xu et al.

(10) Patent No.: US 11,079,635 B2
(45) Date of Patent: Aug. 3, 2021

(54) SEALANT AND METHOD FOR FABRICATING THE SAME, AND DISPLAY DEVICE

(71) Applicants: BOE Technology Group Co., Ltd., Beijing (CN); Hefei BOE Display Technology Co., Ltd., Anhui (CN)

(72) Inventors: Dong Xu, Beijing (CN); Xiaoqing Liu, Beijing (CN); Wenbo Dong, Beijing (CN)

(73) Assignees: BOE Technology Group Co., Ltd., Beijing (CN); Hefei BOE Display Technology Co., Ltd., Hefei (CN)

( * ) Notice: Subject to any disclaimer, the term of this patent is extended or adjusted under 35 U.S.C. 154(b) by 180 days.

(21) Appl. No.: 16/034,877

(22) Filed: Jul. 13, 2018

(65) Prior Publication Data
US 2019/0204637 A1   Jul. 4, 2019

(30) Foreign Application Priority Data
Jan. 3, 2018 (CN) .......................... 201810004206.X

(51) Int. Cl.
*G02F 1/1339* (2006.01)
*C09J 163/10* (2006.01)
(Continued)

(52) U.S. Cl.
CPC ........... *G02F 1/1339* (2013.01); *C08G 59/40* (2013.01); *C08G 59/62* (2013.01); *C09J 163/10* (2013.01);
(Continued)

(58) Field of Classification Search
CPC ........ C08G 59/40; C08G 59/62; C09J 163/10; G02F 1/1339; C09K 2323/031; C09K 2323/055
See application file for complete search history.

(56) References Cited

U.S. PATENT DOCUMENTS

2009/0162667 A1   6/2009   Radkov
2010/0227949 A1 *  9/2010   Tamai ................. C08L 33/14
                                                       523/400
(Continued)

FOREIGN PATENT DOCUMENTS

| CN | 103087641 A | 5/2013 |
| CN | 103305153 A | 9/2013 |

(Continued)

OTHER PUBLICATIONS

Zhou, Dual Light-emitting Properties of Phosphorescence of Aqueous Polyurethane Based on Benzophenone Derivatives; Chinese Masters Theses Full Text Databas Engineering Science Tech. I, pp. B016-58.

(Continued)

*Primary Examiner* — Sophie Hon
(74) *Attorney, Agent, or Firm* — Arent Fox LLP; Michael Fainberg

(57) ABSTRACT

The disclosure discloses a sealant and a method for fabricating the same, and a display device. The sealant includes a thermal-curing agent and an epoxy resin, wherein the thermal-curing agent includes a diphenyl ketone alcohol compound capable of emitting a fluorescent light and a phosphorescent light simultaneously.

20 Claims, 2 Drawing Sheets

(51) Int. Cl.
*C08G 59/40* (2006.01)
*C08G 59/62* (2006.01)

(52) U.S. Cl.
CPC .. *C09K 2323/031* (2020.08); *C09K 2323/055* (2020.08)

(56) References Cited

U.S. PATENT DOCUMENTS

| | | | |
|---|---|---|---|
| 2013/0296454 A1* | 11/2013 | Madsen | C08F 2/50 522/35 |
| 2014/0348776 A1* | 11/2014 | Palmer, Jr. | C08K 3/20 424/78.09 |
| 2015/0277190 A1* | 10/2015 | Zhong | C09K 19/52 349/89 |
| 2016/0244662 A1 | 8/2016 | Zhao et al. | |

FOREIGN PATENT DOCUMENTS

| | | |
|---|---|---|
| CN | 104927017 A | 9/2015 |
| CN | 105086841 A | 11/2015 |
| CN | 107369701 A | 11/2017 |
| JP | 2017187665 A | 10/2017 |

OTHER PUBLICATIONS

Rong et al. Dual Light-emitting Properties of Hydroxyl-terminated Poly(lactic acid) Based on Benzophenone Derivatives, Chemical Journal of Chinese Universite, vol. 38, No. 8, pp. 1542-1550.
Chinese Office Action dated Mar. 27, 2020 for Chinese Application CN201810004206.X.

* cited by examiner

SEALANT AND METHOD FOR FABRICATING THE SAME, AND DISPLAY DEVICE

CROSS-REFERENCE TO RELATED APPLICATION

This Application claims priority to Chinese Patent Application No. 201810004206.X, filed on Jan. 3, 2018, the content of which is incorporated by reference in the entirety.

TECHNICAL FIELD

This disclosure relates to the field of adhesives, and particularly to a sealant and a method for fabricating the same, and a display device.

DESCRIPTION OF THE RELATED ART

A liquid crystal panel is generally fabricated by box-aligning an array substrate and an opposite substrate; and a sealant, as an adhesive, bonds the array substrate and the opposite substrate together, thereby sealing liquid crystal in the box.

In a box-aligning process in the related art, a thin film transistor (TFT) array substrate coated with liquid crystal and an opposite substrate coated with a sealant are box-aligned, where the sealant is cured through ultraviolet (UV) curing and/or thermal curing to form a stable and complete glue body, thus the sealant is a key material in a thin film transistor-liquid crystal display (TFT-LCD) manufacturing procedure. However, in a vacuum box-aligning process, the sealant tends to have cracks, bubbles and the like due to factors such as liquid crystal impact and abnormal control of a curing process, thus leading to abnormalities such as liquid crystal leakage, etc. Therefore, how to detect the abnormalities of the sealant easily and conveniently is an urgent problem to be solved in this field.

SUMMARY

Embodiments of the disclosure provide a sealant and a method for fabricating the same, and a display device.

In an aspect, embodiments of the disclosure provide a sealant including a thermal-curing agent and an epoxy resin, wherein the thermal-curing agent includes a diphenyl ketone alcohol compound capable of emitting a fluorescent light and a phosphorescent light simultaneously.

In some embodiments, a content of the thermal-curing agent in the sealant ranges from 6 wt % to 10 wt % and a content of the epoxy resin in the sealant ranges from 45 wt % to 55 wt %.

In some embodiments, the sealant further includes an acrylate resin, a photo-curing agent and a solvent.

In some embodiments, a content of the acrylate resin in the sealant ranges from 35 wt % to 45 wt %, a content of the photo-curing agent in the sealant ranges from 1 wt % to 3 wt %, and a content of the solvent in the sealant ranges from 0 wt % to 5 wt %.

In some embodiments, the diphenyl ketone alcohol compound includes one or more of a {4-[bis-(2-hydroxy-ethyl)-amino]-phenyl}-phenyl-ketone, a {4-[bis-(2-hydroxy-ethyl)-amino]-phenyl}-(4-chloro-phenyl)-ketone, a {4-[bis-(2-hydroxy-ethyl)-amino]-phenyl}-(4-fluro-phenyl)-ketone, a {4-[(2-hydroxy-ethyl)-methyl-amino]-phenyl}-phenyl-ketone, a (4-chlorphenyl)-{4-[(2-hydroxyethyl)-methyl-amino]-phenyl}-ketone, a (4-fluro-phenyl)-{4-[(2-hydroxy-ethyl)-methyl-amino]-phenyl}-ketone; and a bis{4-[2-hydroxy-ethyl}-methyl-amino]-phenyl}-ketone.

In some embodiments, the epoxy resin includes an epoxy chloropropane resin and/or an epoxypropane resin.

In some embodiments, the thermal-curing agent further includes an amine thermal-curing agent.

In some embodiments, the amine thermal-curing agent includes one or more of a hexamethylenediamine, an ethylenediamine, a β-hydroxyethyl hexamethylenediamine, a β-hydroxyethyl ethylenediamine and a hydroxymethyl hexamethylenediamine.

In some embodiments, the acrylate resin includes a methyl methacrylate resin and/or a butyl methacrylate resin; the photo-curing agent includes a cationic photo-curing agent and/or a radical photo-curing agent; the solvent includes one or more of an acetone, an ethyl acetate and a butyl acetate.

In another aspect, embodiments of the disclosure provide a method for fabricating a sealant, including: mixing and dissolving a diphenyl ketone alcohol compound, an acrylate resin, an epoxy resin and a solvent, wherein the diphenyl ketone alcohol compound is capable of emitting a fluorescent light and a phosphorescent light simultaneously; and adding a photo-curing agent, or the photo-curing agent and an amine thermal-curing agent into a mixture obtained from operations of the mixing and dissolving, and then defoaming the mixture to obtain the sealant.

In still another aspect, embodiments of the disclosure provide a display device including a sealant, wherein the sealant includes a thermal-curing agent and an epoxy resin, wherein the thermal-curing agent includes a diphenyl ketone alcohol compound capable of emitting a fluorescent light and a phosphorescent light simultaneously.

In some embodiments, a content of the thermal-curing agent in the sealant ranges from 6 wt % to 10 wt % and a content of the epoxy resin in the sealant ranges from 45 wt % to 55 wt %.

In some embodiments, the sealant further includes an acrylate resin, a photo-curing agent and a solvent.

In some embodiments, a content of the acrylate resin in the sealant ranges from 35 wt % to 45 wt %, a content of the photo-curing agent in the sealant ranges from 1 wt % to 3 wt %, and a content of the solvent in the sealant ranges from 0 wt % to 5 wt %.

In some embodiments, the diphenyl ketone alcohol compound includes one or more of a {4-[bis-(2-hydroxy-ethyl)-amino]-phenyl}-phenyl-ketone, a {4-[bis-(2-hydroxy-ethyl)-amino]-phenyl}-(4-chloro-phenyl)-ketone, a {4-[bis-(2-hydroxy-ethyl)-amino]-phenyl}-(4-fluro-phenyl)-ketone, a {4-[(2-hydroxy-ethyl)-methyl-amino]-phenyl}-phenyl-ketone, a (4-chlorphenyl)-{4-[(2-hydroxyethyl)-methyl-amino]-phenyl}-ketone, a (4-fluro-phenyl)-{4-[(2-hydroxy-ethyl)-methyl-amino]-phenyl}-ketone; and a bis{4-[2-hydroxy-ethyl}-methyl-amino]-phenyl}-ketone.

In some embodiments, the epoxy resin includes an epoxy chloropropane resin and/or an epoxypropane resin.

In some embodiments, the thermal-curing agent further includes an amine thermal-curing agent.

In some embodiments, the amine thermal-curing agent includes one or more of a hexamethylenediamine, an ethylenediamine, a β-hydroxyethyl hexamethylenediamine, a β-hydroxyethyl ethylenediamine and a hydroxymethyl hexamethylenediamine.

In some embodiments, the acrylate resin includes a methyl methacrylate resin and/or a butyl methacrylate resin; the photo-curing agent includes a cationic photo-curing agent and/or a radical photo-curing agent; the solvent includes one or more of an acetone, an ethyl acetate and a butyl acetate.

BRIEF DESCRIPTION OF THE DRAWINGS

In order to make the technical solutions according to embodiments of the disclosure more apparent, the drawings to which a description of the embodiments refers will be briefly introduced below, and apparently the drawings to be described below are merely illustrative of some of the embodiments of the disclosure, and those ordinarily skilled in the art can derive from these drawings other drawings without any inventive effort.

FIG. 1A is a light-emitting diagram of the fluorescent/phosphorescent double-emission diphenyl ketone alcohol compound under an illumination condition of UV light in air; FIG. 1B is a light-emitting diagram of the fluorescent/phosphorescent double-emission diphenyl ketone alcohol compound under an illumination condition of UV light in vacuum; FIG. 1C is a transient light-emitting diagram of the fluorescent/phosphorescent double-emission diphenyl ketone alcohol compound in vacuum when the UV light is closed.

DETAILED DESCRIPTION OF THE EMBODIMENTS

Figure 1:
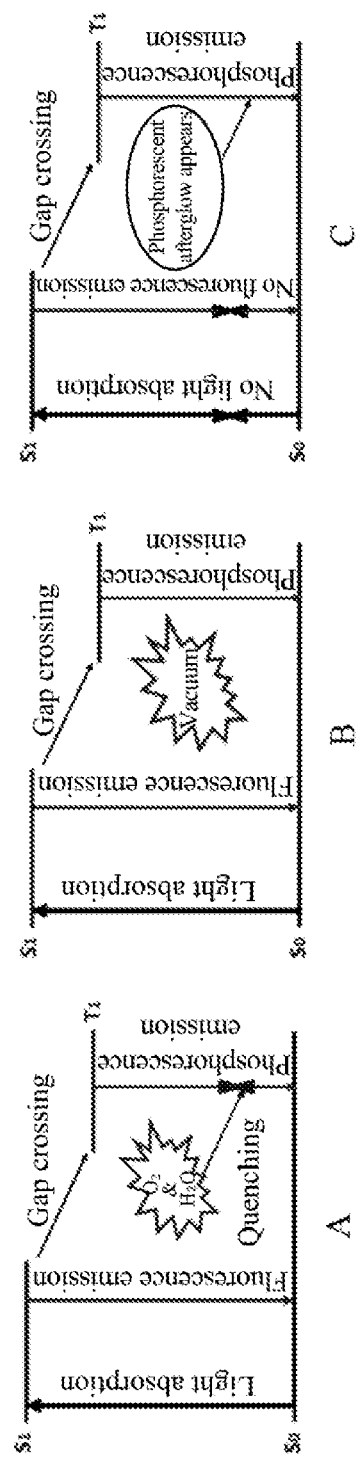
FIG. 1 is a light-emitting energy level diagram of a fluorescent/phosphorescent double-emission diphenyl ketone alcohol compound; where

In order to make the objects, technical solutions, and advantages of the embodiments of the disclosure more apparent, the technical solutions according to the embodiments of the disclosure will be described below clearly and fully with reference to the drawings in the embodiments of the disclosure, and apparently the embodiments described below are only a part but not all of the embodiments of the disclosure. Based upon the embodiments here of the disclosure, all the other embodiments which can occur to those skilled in the art without any inventive effort shall fall into the scope of the disclosure.

It shall be appreciated that the following descriptions of the embodiments presented herein are merely intended to illustrate and describe, but not to limit the disclosure.

Embodiments of the disclosure provide a sealant including a thermal-curing agent and an epoxy resin, wherein the thermal-curing agent includes a diphenyl ketone alcohol compound capable of emitting a fluorescent light and a phosphorescent light simultaneously.

In some embodiments, a content of the thermal-curing agent in the sealant ranges from 6 wt % to 10 wt % and a content of the epoxy resin in the sealant ranges from 45 wt % to 55 wt %.

In some embodiments, the sealant further includes an acrylate resin, a photo-curing agent and a solvent.

In some embodiments, a content of the acrylate resin in the sealant ranges from 35 wt % to 45 wt %, a content of the photo-curing agent in the sealant ranges from 1 wt % to 3 wt %, and a content of the solvent in the sealant ranges from 0 wt % to 5 wt %.

In some embodiments, the thermal-curing agent further includes an amine thermal-curing agent.

In some embodiments, a content of the diphenyl ketone alcohol compound in the thermal-curing agent can be changed randomly within a range from more than 0% to 100% (based on a total weight of the thermal-curing agent). That is, in the sealant according to the embodiments of the disclosure, the amine thermal-curing agent is partially or entirely replaced by the diphenyl ketone alcohol compound.

In the sealant according to the embodiments of the disclosure, the diphenyl ketone alcohol compound (e.g. a diphenyl ketone alcohol derivative molecule) which is capable of simultaneously emitting the fluorescent light and the phosphorescent light is adopted to be mixed with a traditional sealant containing an acrylate resin, an epoxy resin, an amine thermal-curing agent and other components. In a thermal-curing process, the diphenyl ketone alcohol compound partially or completely replaces the amine thermal-curing agent to initiate ring-opening polymerization of epoxy molecules, and a double-emission molecule is embedded into an epoxy resin molecule chain with a chemical bond to generate a new type of sealant having a fluorescent/phosphorescent double-emission feature. The new type of sealant has the advantages of good resistance of mobility, lasting and stable light emission performance, uniform distribution, difficult to be separated, non-pollution to liquid crystal, and the like.

The new type of sealant according to the embodiments of the disclosure is sensitive to air (for example, oxygen and moisture), and has following characteristics under the illumination of UV light: emits a blue fluorescent light in air, emits a blue and white fluorescent/phosphorescent mixed light in vacuum, and generates green phosphorescent afterglow (with a service life of 50 ms or more) in vacuum when the UV light is closed. The completeness of the sealant can be detected according to the change of the emitting color of the sealant under the illumination of UV light; and the advantages of clear picture, visual phenomenon, long light-emitting service life, rapid observation, convenient operation and the like can be achieved, and abnormalities in the coating process of the sealant can be rapidly detected to avoid taping out accordingly, thereby improving product yield and saving time of a company and material cost.

When being used for sealant detection, the double-emission sealant according to the embodiments of the disclosure also has the advantages of high detection precision (for example, the fluorescent light and the phosphorescent light can be simultaneously emitted by the double-emission sealant under a vacuum working condition ($10^3$-$10^2$ Pa) of an ordinary water pump to generate a noticeable change in color, where a vacuum degree used by the double-emission sealant is far larger than a vacuum degree (about 10 Pa) used by a Vacuum Align System (VAS) in an ODF process), strong visibility; high sensitivity and the like.

In some embodiments, the diphenyl ketone alcohol compound is selected from one or more of a {4-[bis-(2-hydroxy-ethyl)-amino]-phenyl}-phenyl-ketone, a {-[bis-(2-hydroxy-ethyl)-amino]-phenyl}-(4-chloro-phenyl)-ketone, a {4-[bis-(2-hydroxy-ethyl)-amino]-phenyl}-(4-fluro-phenyl)-ketone, a {4-[(2-hydroxy-ethyl)-methyl-amino]-phenyl}-phenyl-ketone, a (4-chlorphenyl)-{4[(2-hydroxyethyl)-methyl-amino]-phenyl}-ketone, a (4-fluro-phenyl)-{4-[(2-hydroxy-ethyl)-methyl-amino]-phenyl}-ketone; and a bis{4-[2-hydroxy-ethyl}-methyl-amino]-phenyl}-ketone; where corresponding chemical structure formulas are as follows in turn.

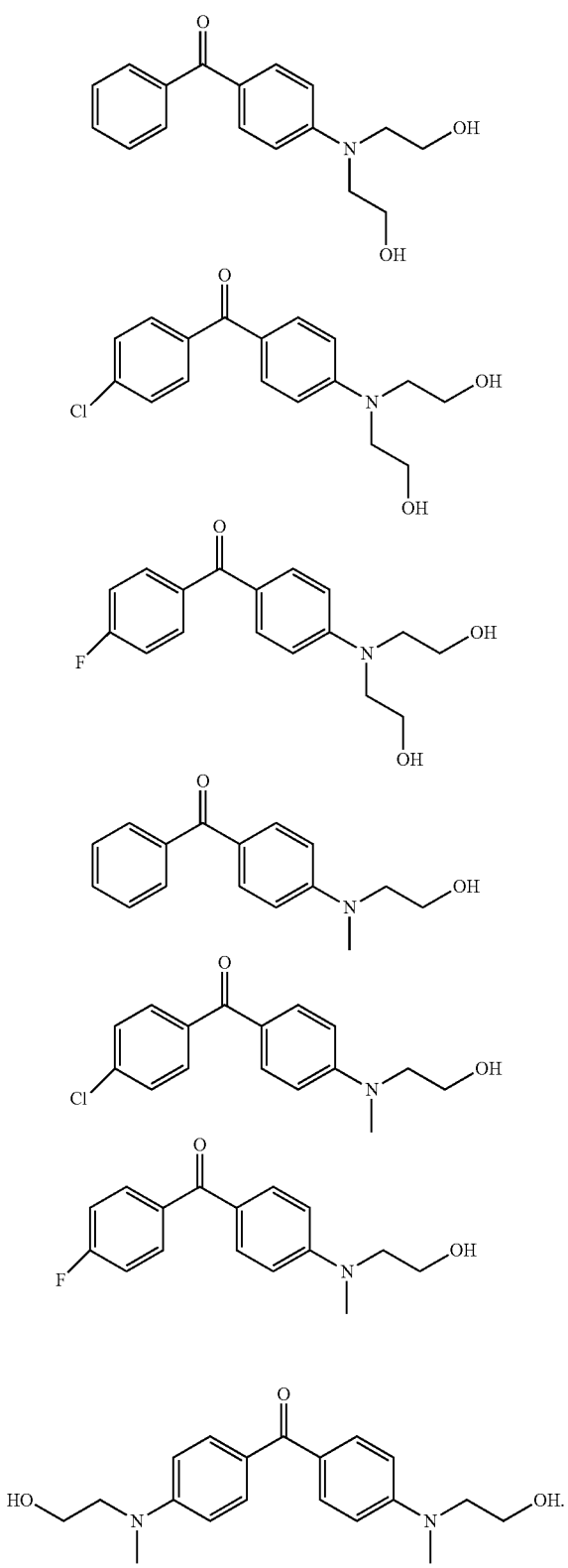

In some embodiments, the epoxy resin is a mixture of an epoxy resin prepolymer and an epoxy resin monomer. In some embodiments, in the epoxy resin, a mass ratio of the epoxy resin prepolymer to the epoxy resin monomer is (2~4.5):1.

In some embodiments, the epoxy resin is selected from one or more of an epoxy chloropropane resin and an epoxypropane resin. That is, in the epoxy resin, the epoxy resin prepolymer is an epoxy chloropropane resin prepolymer, and meanwhile, the epoxy resin monomer is an epoxy chloropropane monomer; or in the epoxy resin, the epoxy resin prepolymer is an epoxypropane resin prepolymer, and meanwhile, the epoxy resin monomer is an epoxypropane monomer, etc.

In some embodiments, the acrylate resin is a mixture of an acrylate prepolymer and an acrylate monomer, which has a molecular weight of 1000-5000. In some embodiments, in the acrylate resin, a mass ratio of the acrylate prepolymer to the acrylate monomer is (2~4.5):1.

In some embodiments, the acrylate resin is selected from one or more of a methyl methacrylate resin, a butyl methacrylate resin and an ethyl methacrylate resin. That is, in the acrylate resin, the acrylate prepolymer is a methyl methacrylate prepolymer, and meanwhile, the acrylate monomer is a methyl methacrylate monomer; or in the acrylate resin, the acrylate prepolymer is a butyl methacrylate prepolymer, and meanwhile, the acrylate monomer is a butyl methacrylate monomer, etc.

In some embodiments, the photo-curing agent is selected from one or more of a cationic photo-curing agent and a radical photo-curing agent.

In some embodiments, the solvent is selected from one or more of an acetone, an ethyl acetate and a butyl acetate. In addition, the acrylate monomer can also function as the solvent to dissolve a part of substances, and thus, in some embodiments, the content of the solvent can be 0.

In some embodiments, the amine thermal-curing agent is selected from one or more of a hexamethylenediamine, an ethylenediamine, a β-hydroxyethyl hexamethylenediamine, a β-hydroxyethyl ethylenediamine and a hydroxymethyl hexamethylenediamine.

A light-emitting mechanism of the diphenyl ketone alcohol compound according to the embodiments of the disclosure is as follows: a low-energy ground-state electron is excited into a high-energy excited singlet state electron through absorption of UV light energy (S0→S1); an excited singlet state exciton can be transformed into an excited triplet state exciton through gap crossing (S1→T1). The electron in an excited state is high in energy and unstable, can return back to S0 through a manner of radiative transition or non-radiative transition, and releases energy in a light-emitting form, so as to realize the photoluminescence; where, a fluorescent light is emitted from S1→S0, and a phosphorescent light is emitted from T1→S0.

In addition, photoluminescent mechanisms of the diphenyl ketone alcohol compound according to the embodiments of the disclosure in the presence/absence of air are different, as illustrated in FIG. 1. Where FIG. 1A illustrates that under the UV light illumination condition in air, only S0→S1 transition exists, a fluorescent light is emitted, and a phosphorescent light (T1→S0) has a long service life and is completely quenched by oxygen and water in air. FIG. 1B illustrates that under the UV light illumination condition in vacuum, an excited singlet state exciton and an excited triplet state exciton simultaneously exist, but since there are no oxygen and water in air to generate a quenching effect on the triplet state exciton, two radiative transitions S1→S0 and T1→S0 exist at the same time, a fluorescent/phosphorescent double-emission character is achieved, and emitting color changes significantly. FIG. 1C illustrates that in vacuum and when UV light is closed, exitation energy disappears, since the fluorescent light has a short service life, exited singlet state light emission immediately disappears, but since the phosphorescent light has a long service life, excited triplet state light emission continues to exist for a certain time, and macroscopic phosphorescent afterglow appears.

Based upon a same inventive concept, the embodiments of the disclosure further provide a method for fabricating a sealant, the method includes the following operations.

Mixing and dissolving a diphenyl ketone alcohol compound, an acrylate resin, an epoxy resin and a solvent, wherein the diphenyl ketone alcohol compound is capable of emitting a fluorescent light and a phosphorescent light simultaneously; and adding a photo-curing agent into a mixture obtained from operations of the mixing and dissolving, and then defoaming the mixture to obtain the sealant.

Based upon a same inventive concept, the embodiments of the disclosure further provide another method for fabricating a sealant, the method includes the following operations.

Mixing and dissolving a diphenyl ketone alcohol compound, an acrylate resin, an epoxy resin and a solvent, wherein the diphenyl ketone alcohol compound is capable of emitting a fluorescent light and a phosphorescent light simultaneously; and adding a photo-curing agent and an amine thermal-curing agent into a mixture obtained from operations of the mixing and dissolving, and then defoaming the mixture to obtain the sealant.

In order to describe the sealant according to the embodiments of the disclosure in detail, the method for fabricating the sealant according to the embodiments of the disclosure will be further described in combination with embodiments below.

In some embodiments, the method for fabricating the sealant according to the embodiments of the disclosure includes following operations.

Unfreezing all components of the sealant to room temperature by heating.

Mixing and stirring 7 copies of {4-[bis-(2-hydroxy-ethyl)-amino]-phenyl}-(4-chloro-phenyl)-ketone, 40 copies of methyl methacrylate resin (a weight ratio of an acrylate prepolymer to an acrylate monomer is 3.5:1), 46.5 copies of epoxypropane resin (a weight ratio of a prepolymer to a monomer thereof is 2:1) and 3 copies of butyl acetate thoroughly until they are dissolved.

Adding 3 copies of photo-curing agent and 0.5 copies of β-hydroxyethyl ethanediamine into a resulting mixture, mixing the mixture thoroughly, and then defoaming the mixture to obtain an unpolymerized sealant crude product.

Obtaining a film containing a copolymer fluorescent/phosphorescent double-emission sealant in which a mass ratio of an amine thermal-curing agent (β-hydroxyethyl ethanediamine) to a diphenyl ketone alcohol derivative is 1:14) through sealant coating, vacuum aligner system (VAS) box-aligning as well as UV light curing and thermal-curing processes.

Where a photoluminescent effect of this sealant film can be verified by an environmental simulation approach, and results are as follows.

Environmental stimulation is carried out on a following situation A: the sealant is complete and has no breakage, vacuum condition exists in a Cell box, and UV illumination stops after lasting for 30 s (situation A); a stimulation mode is that the sealant film according to the embodiments of the disclosure is put into a quartz glass bottle being in complete vacuum ($N_2$ atmosphere), and UV illumination stops after lasting for 30 s; a stimulation result is that the sealant film in the quartz glass bottle has green phosphorescent afterglow.

Environmental stimulation is carried out on a following situation B: the sealant is partially broken, air enters into the Cell box, and UV illumination is carried out on the sealant (situation B); a stimulation mode is that the sealant film according to the embodiments of the disclosure is put into a quartz glass bottle being partially in vacuum (one part is in $N_2$ atmosphere, and the other part is in air), and UV illumination is carried out; a stimulation result is that the sealant film in the quartz glass bottle emits a fluorescent light and a phosphorescent light simultaneously, which appears a bright blue and white light.

Environmental stimulation is carried out on a following situation C: the sealant is completely broken, the Cell box is full of air, and UV illumination is carried out on the sealant (situation C); a stimulation mode is that the sealant film according to the embodiments of the disclosure is put into a quartz glass bottle which is completely full of air, and is subjected to UV illumination; a stimulation result is that the sealant film in the quartz glass bottle only emits a blue fluorescent light under the UV illumination.

Under the different three situations, the emitting color of the sealant film in the quartz glass bottle is obviously changed, and thus when sealant detection is carried out, high resolution can be achieved. This stimulation fully illustrates the fluorescent/phosphorescent double-emission sealant according to the embodiments of the disclosure is excellent in the detection of sealant.

Figure 2:
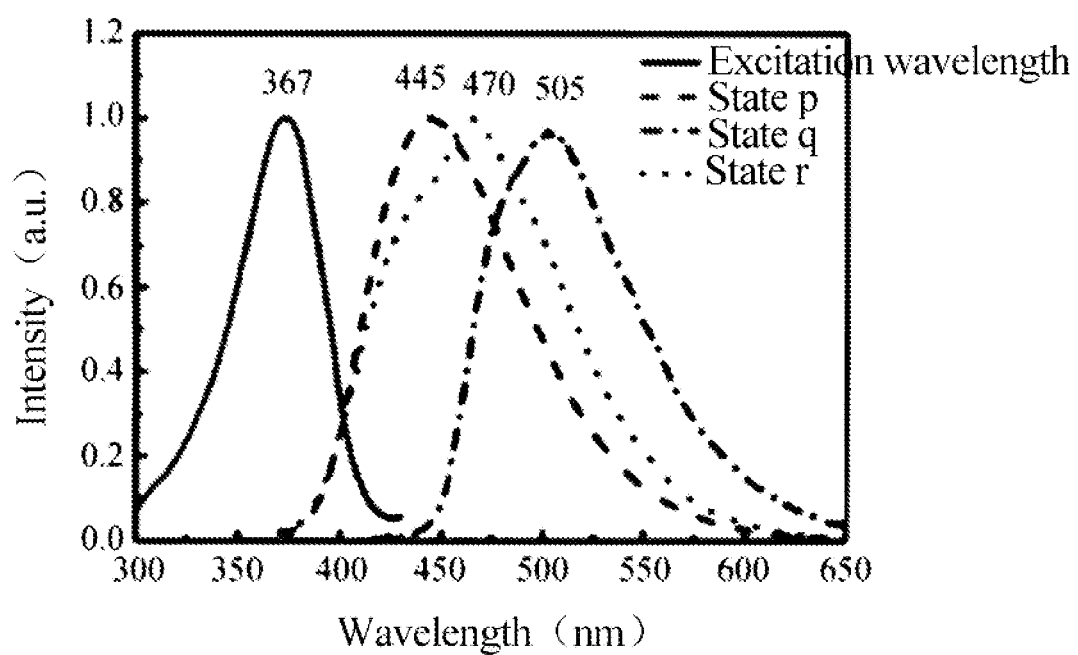
FIG. 2 is an excitation spectrum of a film to be detected, and emission spectra under an illumination condition p of UV light in air, under an illumination condition q of UV light in N2 atmosphere and under an illumination condition r that UV light is closed in the N2 atmosphere, of the film to be detected according to the embodiments of the disclosure.

In addition, a photoluminescence spectrum of the sealant film is tested using a fluorescence spectrophotometer of a FluorMax-4 model produced by HORIBA SCIENTIFIC company, and a result is as shown in FIG. 2.

FIG. 2 illustrates that under an excitation wavelength of 367 nm, the fluorescence spectrophotometer is used to respectively measure photoluminescence curve graphs of the film of the double-emission sealant under following three conditions. A state r): the sealant is complete and has no breakage, the Cell box is in vacuum, the UV illumination stops after lasting for 30 s, a wavelength of a maximum emission peak in the emission spectrum is 470 nm; a state q): the sealant is partially broken, air enters into the Cell box, and the wavelength of the maximum emission peak in the emission spectrum is 505 nm; a state p): the sealant is completely broken, the Cell box is full of air, the wavelength of the maximum emission peak in the emission spectrum is 445 nm. The wavelengths of the maximum emission peaks in the emission spectra under the three states are obviously different. This stimulation fully illustrates the fluorescent/phosphorescent double-emission sealant is excellent in the detection of sealant.

For the sealant fabricated by the method according to the embodiments of the disclosure, its maximum absorption peak is in an ultraviolet region, and it can emit a bright blue fluorescent light, a green phosphorescent light and a blue and white mixed light, and it is high in quantum yield within a light-emitting range, few in light-emitting molecule use quantity and low in cost.

In some embodiments, the method for fabricating the sealant according to the embodiments of the disclosure includes following operations.

Unfreezing all components of the sealant to room temperature by heating.

Mixing and stirring 6 copies of {4-[bis-(2-hydroxy-ethyl)-amino]-phenyl}-phenyl-ketone, 42 copies of butyl methacrylate resin (a weight ratio of an acrylate prepolymer to an acrylate monomer is 3:1), 50 copies of epoxy chloropropane resin (a weight ratio of a prepolymer to a monomer is 4.5:1) and 1 copy of acetone thoroughly until they are dissolved.

Adding 1 copy of photo-curing agent into a resulting mixture, mixing the mixture thoroughly, and then defoaming the mixture to obtain an unpolymerized sealant crude product.

Obtaining a film containing a copolymer fluorescent/phosphorescent double-emission sealant in which an amine thermal-curing agent is not contained through sealant coating, VAS box-aligning as well as UV light curing and thermal-curing processes.

Where a test method and a simulation approach similar to that mentioned above can be used to verify the photoluminescence effect and to obtain the photoluminescence spectrum of this sealant film. Where the photoluminescence effect of this sealant film is the same as that of the sealant film fabricated by the previous method, and the photoluminescence spectrum is similar to that illustrated in FIG. 2, and thus this sealant exhibits good resolution as well when being used for sealant detection.

In some embodiments, the method for fabricating the sealant according to the embodiments of the disclosure includes following operations.

Unfreezing all components of the sealant to room temperature by heating.

Mixing and stirring 8 copies of {4-[bis-(2-hydroxy-ethyl)-amino]-phenyl}-(4-fluro-phenyl)-ketone, 35 copies of ethyl methacrylate resin (a weight ratio of an acrylate prepolymer to an acrylate monomer is 4:1), 50.5 copies of epoxy chloropropane resin (a weight ratio of the prepolymer to the monomer is 2.5:1) and 4 copies of ethyl acetate thoroughly until they are dissolved.

Adding 1.5 copies of photo-curing agent and 1 copy of ethylenediamine into a resulting mixture, mixing the mixture thoroughly, and then defoaming the mixture to obtain an unpolymerized sealant crude product.

Obtaining a film of a copolymer fluorescent/phosphorescent double-emission sealant film containing an amine thermal-curing agent (ethylenediamine) and a diphenyl ketone alcohol derivative in a mass ratio of 1:8 through sealant coating, VAS box-aligning as well as UV light curing and thermal-curing processes.

Where the photoluminescence effect of this sealant film is the same as that of the sealant film fabricated by the previous method, and the photoluminescence spectrum is similar to that illustrated in FIG. 2, and thus this sealant exhibits good resolution as well when being used for sealant detection.

In some embodiments, the method for fabricating the sealant according to the embodiments of the disclosure includes following operations.

Unfreezing all components of the sealant to room temperature by heating.

Mixing and stirring 5 copies of {4-[bis-(2-hydroxy-ethyl)-methyl-amino]-phenyl}-phenyl-ketone, 41.5 copies of methyl methacrylate resin (a weight ratio of an acrylate prepolymer to an acrylate monomer is 3:1), 45 copies of epoxy chloropropane resin (a weight ratio of the prepolymer to the monomer is 4:1) and 5 copies of acetone thoroughly until they are dissolved.

Adding 2.5 copies of photo-curing agent and 1 copy of ethylenediamine into a resulting mixture, mixing the mixture thoroughly, and then defoaming the mixture to obtain an unpolymerized sealant crude product.

Obtaining a film of a copolymer fluorescent/phosphorescent double-emission sealant containing an amine thermal-curing agent (ethylenediamine) and a diphenyl ketone alcohol derivative in a mass ratio of 1:6 through sealant coating, VAS box-aligning as well as UV light curing and thermal-curing processes.

Where the photoluminescence effect of this sealant film is the same as that of the sealant film fabricated by the previous method, and the photoluminescence spectrum is similar to that illustrated in FIG. 2, and thus this sealant exhibits good resolution as well when being used for sealant detection.

In some embodiments, the method for fabricating the sealant according to the embodiments of the disclosure includes following operations.

Unfreezing all components of the sealant to room temperature by heating.

Mixing and stirring 6 copies of (4-chlorphenyl)-{4-[(2-hydroxyethyl)-methyl-amino]-phenyl}-ketone, 37.2 copies of butyl methacrylate resin (a weight ratio of an acrylate prepolymer to an acrylate monomer is 2:1) and 55 copies of epoxypropane resin (a weight ratio of the prepolymer to the monomer is 3.5:1) thoroughly until they are dissolved.

Adding 1 copy of photo-curing agent and 0.8 copy of hydroxymethyl hexamethylenediamine into a resulting mixture, mixing the mixture thoroughly, and then defoaming the mixture to obtain an unpolymerized sealant crude product.

Obtaining a film of a copolymer fluorescent/phosphorescent double-emission sealant containing an amine thermal-curing agent (hydroxymethyl hexamethylenediamine) and a diphenyl ketone alcohol derivative in a mass ratio of 1:7.5 through sealant coating, VAS box-aligning as well as UV light curing and thermal-curing processes.

Where the photoluminescence effect of this sealant film is the same as that of the sealant film fabricated by the previous method, and the photoluminescence spectrum is similar to that illustrated in FIG. 2, and thus this sealant exhibits good resolution as well when being used for sealant detection.

In some embodiments, the method for fabricating the sealant according to the embodiments of the disclosure includes following operations.

Unfreezing all components of the sealant to room temperature by heating.

Mixing and stirring 8 copies of (4-fluro-phenyl)-{4-[(2-hydroxy-ethyl)-methyl-amino]phenyl}-ketone, 35.9 copies of ethyl methacrylate resin (a weight ratio of an acrylate prepolymer to an acrylate monomer is 2.5:1), 52 copies of epoxypropane resin (a weight ratio of the prepolymer to the monomer is 3:1) and 2 copies of ethyl acetate thoroughly until they are dissolved.

Adding 1.8 copies of photo-curing agent and 0.3 copies of β-hydroxyethyl hexamethylenediamine into a resulting mixture, mixing the mixture thoroughly, and then defoaming the mixture to obtain an unpolymerized sealant crude product.

Obtaining a film of a copolymer fluorescent/phosphorescent double-emission sealant containing an amine thermal-curing agent (β-hydroxyethyl hexamethylenediamine) and a diphenyl ketone alcohol derivative in a mass ratio of 1:27 through sealant coating, VAS box-aligning as well as UV light curing and thermal-curing processes.

Where the photoluminescence effect of this sealant film is the same as that of the sealant film fabricated by the previous method, and the photoluminescence spectrum is similar to that illustrated in FIG. 2, and thus this sealant exhibits good resolution as well when being used for sealant detection.

In some embodiments, the method for fabricating the sealant according to the embodiments of the disclosure includes following operations.

Unfreezing all components of the sealant to room temperature by heating.

Mixing and stirring 10 copies of bis-(4-hydroxy-ethyl)-methyl-amino]-phenyl}-ketone, 36 copies of butyl methacrylate resin (a weight ratio of an acrylate prepolymer to an acrylate monomer is 2:1), 47 copies of epoxypropane resin (a weight ratio of the prepolymer to the monomer is 3.5:1) and 5 copies of ethyl acetate thoroughly until they are dissolved.

Adding 2 copies of photo-curing agent into a resulting mixture, mixing the mixture thoroughly, and then defoaming the mixture to obtain an unpolymerized sealant crude product.

Obtaining a film of a copolymer fluorescent/phosphorescent double-emission sealant in which an amine thermal-curing agent is not contained through sealant coating, VAS box-aligning as well as UV light curing and thermal-curing processes.

Where the photoluminescence effect of this sealant film is the same as that of the sealant film fabricated by the previous method, and the photoluminescence spectrum is similar to that illustrated in FIG. 2, and thus this sealant exhibits good resolution as well when being used for sealant detection.

In some embodiments, the method for fabricating the sealant according to the embodiments of the disclosure includes following operations.

Unfreezing all components of the sealant to room temperature by heating.

Mixing and stirring 7 copies of bis-(4-hydroxy-ethyl)-methyl-amino]-phenyl}-ketone, 45 copies of methyl methacrylate resin (a weight ratio of an acrylate prepolymer to an acrylate monomer is 4.3:1), 45.5 copies of epoxy chloropropane resin (a weight ratio of the prepolymer to the monomer is 3:1) and 2 copies of acetone thoroughly until they are dissolved.

Adding 0.5 copies of photo-curing agent into a resulting mixture, mixing the mixture thoroughly, and then defoaming the mixture to obtain an unpolymerized sealant crude product.

Obtaining a film of a copolymer fluorescent/phosphorescent double-emission sealant in which an amine thermal-curing agent is not contained through sealant coating, VAS box-aligning as well as UV light curing and thermal-curing processes.

Where the photoluminescence effect of this sealant film is the same as that of the sealant film fabricated by the previous method, and the photoluminescence spectrum is similar to that illustrated in FIG. 2, and thus this sealant exhibits good resolution as well when being used for sealant detection.

In a comparative embodiment, the method for fabricating the sealant includes following operations.

Unfreezing all components of the sealant to room temperature by heating.

Mixing 40 copies of methyl methacrylate resin (a weight ratio of an acrylate prepolymer to an acrylate monomer is 3.5:1), 46.5 copies of epoxy propane resin (a weight ratio of the prepolymer to the monomer is 2:1) and 3 copies of butyl acetate thoroughly to obtain sealant liquid.

Adding 3 copies of photo-curing agent and 7.5 copies of polyamide into the sealant liquid, mixing the sealant liquid thoroughly, and then defoaming the sealant liquid to obtain an unpolymerized sealant crude product.

Obtaining a film only containing an amine thermal-curing agent (β-hydroxyethyl ethylenediamine) through sealant coating, VAS box-aligning as well as UV light curing and thermal-curing processes. Where the photoluminescence effect of the sealant in this film is verified by adopting an environmental simulation approach, and a results is as follows: due to no light-emitting performance, no matter whether the box is in vacuum, under N2 atmosphere or in the absence of air, and no matter whether the sealant is complete or not, the sealant does not emit light after illumination is ended.

The method according to the comparative embodiment is different from the method according to any one of the embodiments of the disclosure in that the thermal-curing agent of the former is completely an amine thermal-curing agent β-hydroxyethyl ethylenediamine, and a mass ratio of an amine thermal-curing agent (β-hydroxyethyl ethylenediamine) in the later to a diphenyl ketone alcohol derivative is 1:14. Due to no light-emitting performance, the sealant fabricated in the comparative embodiment does not emit light after illumination is ended.

Based upon a same inventive concept, the embodiments of the disclosure further provide a display device including the sealant above according to the embodiments of the disclosure. And reference can be made to the embodiments of the sealant above for an implementation of the display device, so a repeated description thereof will be omitted here.

Based upon a same inventive concept, the embodiments of the disclosure further provide a method for detecting the sealant above according to the embodiments of the disclosure, including: irradiating the sealant in a glass substrate which completes thermal-curing and is cooled, via an ultraviolet device; and judging whether a body of the sealant is complete or not according to color change of light emitted by the sealant.

In some embodiments, the method for detecting the sealant includes following operations.

Placing the glass substrate which completes thermal-curing and is cooled in a detection machine (a side with a thin film transistor (TFT) is upward) which is moveable and turnover.

Making a microscope equipped with a UV light emitter and a camera rotate around the sealant once at a constant speed.

Judging whether the body of the sealant is complete or not according to the change of emitting color of the light emitted by the sealant in a picture of the microscope.

Photographing and recording a position where the color changes to determine a type of abnormality of the sealant.

In some embodiments, the method for detecting the sealant includes following operations.

Placing the glass substrate which completes thermal-curing and is cooled in an operation platform (a side with the TFT is upward).

Illuminating around a coating position of the sealant once by hand using a portable ultraviolet lamp.

Judging whether the body of the sealant is complete or not according to the change of emitting color of the light emitted by the sealant.

Marking a position where the color changes to determine a type of abnormality of the sealant.

Evidently those skilled in the art can make various modifications and variations to the disclosure without departing from the spirit and scope of the disclosure. Accordingly the disclosure is also intended to encompass these modifications and variations thereto so long as the modifications and variations come into the scope of the claims appended to the disclosure and their equivalents.

The invention claimed is:

1. A sealant film, formed from a sealant comprising a thermal-curing agent and an epoxy resin, wherein the thermal-curing agent comprises a diphenyl ketone alcohol compound capable of emitting a fluorescent light and a phosphorescent light simultaneously;

wherein the sealant film is a copolymer fluorescent/phosphorescent double-emission sealant film in which a light-emitting molecule of the diphenyl ketone alcohol compound is embedded into an epoxy resin molecule chain with a chemical bond;

wherein:

when the sealant film has no breakage, and ultraviolet (UV) illumination stops after lasting for a preset time, the sealant film emits a green phosphorescent afterglow;

when the sealant film is partially broken, under the UV illumination, the sealant film emits the fluorescent light and the phosphorescent light simultaneously, which appear as a blue and white mixed fluorescent/phosphorescent light; and when the sealant film is completely broken, under the UV illumination, the sealant film emits a blue fluorescent light.

2. The sealant film according to claim 1, wherein a content of the thermal-curing agent in the sealant ranges from 6 wt % to 10 wt % and a content of the epoxy resin in the sealant ranges from 45 wt % to 55 wt %.

3. The sealant film according to claim 1, wherein the sealant further comprises an acrylate resin, and-a photo-curing agent and a solvent.

4. The sealant film according to claim 3, wherein a content of the acrylate resin in the sealant ranges from 35 wt % to 45 wt %, and a content of the photo-curing agent in the sealant ranges from 1 wt % to 3 wt %.

5. The sealant film according to claim 4, wherein the sealant further comprises a solvent; and a content of the solvent in the sealant is not more than 5 wt %.

6. The sealant film according to claim 3, wherein the acrylate resin comprises a methyl methacrylate resin and/or a butyl methacrylate resin; the photo-curing agent comprises a cationic photo-curing agent and/or a radical photo-curing agent; the solvent comprises one or more of an acetone, an ethyl acetate and a butyl acetate.

7. The sealant film according to claim 1, wherein the diphenyl ketone alcohol compound comprises one or more of:

a {4-[bis-(2-hydroxy-ethyl)-amino]-phenyl}-phenyl-ketone;

a {4-[bis-(2-hydroxy-ethyl)-amino]-phenyl}-(4-chloro-phenyl)-ketone;

a {4-[bis-(2-hydroxy-ethyl)-amino]-phenyl}-(4-fluoro-phenyl)-ketone;

a {4-[(2-hydroxy-ethyl)-methyl-amino]-phenyl}-phenyl-ketone;

a (4-chloro-phenyl)-{4-[(2-hydroxyethyl)-methyl-amino]-phenyl}-ketone;

a (4-fluoro-phenyl)-{4-[(2-hydroxy-ethyl)-methyl-amino]-phenyl}-ketone;

and a bis{4-[{2-hydroxy-ethyl}-methyl-amino]-phenyl}-ketone.

8. The sealant film according to claim 1, wherein the epoxy resin comprises an epoxy chloropropane resin and/or an epoxypropane resin.

9. The sealant film according to claim 1, wherein the thermal-curing agent further comprises an amine thermal-curing agent.

10. The sealant film according to claim 7, wherein the amine thermal-curing agent comprises one or more of a hexamethylenediamine, an ethylenediamine, a (β-hydroxy-ethyl hexamethylenediamine, a (β-hydroxyethyl ethylenediamine and a hydroxymethyl hexamethylenediamine.

11. A method for fabricating the sealant film according to claim 1, comprising: mixing and dissolving the diphenyl ketone alcohol compound, an acrylate resin, the epoxy resin and a solvent; and adding a photo-curing agent, or the photo-curing agent and an amine thermal-curing agent into a mixture obtained from operations of the mixing and dissolving, and then defoaming the mixture to obtain the sealant, prior to forming the sealant film from the sealant.

12. A display device, comprising the sealant film according to claim 1.

13. The display device according to claim 12, wherein a content of the thermal-curing agent in the sealant ranges from 6 wt % to 10 wt % and a content of the epoxy resin in the sealant ranges from 45 wt % to 55 wt %.

14. The display device according to claim 12, wherein the sealant further comprises an acrylate resin, a photo-curing agent and a solvent.

15. The display device according to claim 14, wherein a content of the acrylate resin in the sealant ranges from 35 wt % to 45 wt %, a content of the photo-curing agent in the sealant ranges from 1 wt % to 3 wt %, and a content of the solvent in the sealant is not more than 5 wt %.

16. The display device according to claim 14, wherein the acrylate resin comprises a methyl methacrylate resin and/or a butyl methacrylate resin; the photo-curing agent comprises a cationic photo-curing agent and/or a radical photo-curing agent; the solvent comprises one or more of an acetone, an ethyl acetate and a butyl acetate.

17. The display device according to claim 1, wherein the diphenyl ketone alcohol compound comprises one or more of:

a {4-[bis-(2-hydroxy-ethyl)-amino]-phenyl}-phenyl-ketone;

a {4-[bis-(2-hydroxy-ethyl)-amino]-phenyl}-(4-chloro-phenyl)-ketone;

a {4-[bis-(2-hydroxy-ethyl)-amino]-phenyl}-(4-fluoro-phenyl)-ketone;

a {4-[(2-hydroxy-ethyl)-methyl-amino]-phenyl}-phenyl-ketone;

a (4-chloro-phenyl)-{4-[(2-hydroxyethyl)-methyl-amino]-phenyl}-ketone;

a (4-fluoro-phenyl)-{4-[(2-hydroxy-ethyl)-methyl-amino]-phenyl}-ketone;

and a bis{4-[{2-hydroxy-ethyl}-methyl-amino]-phenyl}-ketone.

18. The display device according to claim 12, wherein the epoxy resin comprises an epoxy chloropropane resin and/or an epoxypropane resin.

19. The display device according to claim 12, wherein the thermal-curing agent further comprises an amine thermal-curing agent.

20. The display device according to claim 19, wherein the amine thermal-curing agent comprises one or more of a hexamethylenediamine, an ethylenediamine, a β-hydroxyethylhexamethylenediamine, a β-hydroxyethylethylenediamine and a hydroxymethyl hexamethylenediamine.

* * * * *